US009295093B2

(12) United States Patent
Martin et al.

(10) Patent No.: US 9,295,093 B2
(45) Date of Patent: Mar. 22, 2016

(54) USING POINTERS TO TAGGED FREQUENCIES TO INDICATE CANDIDATES FOR USE IN REDIRECTION OR RESELECTION

(75) Inventors: Brian Martin, Farnham (GB); Keiichi Kubota, Weybridge (GB)

(73) Assignee: BROADCOM CORPORATION, Irvine, CA (US)

( * ) Notice: Subject to any disclaimer, the term of this patent is extended or adjusted under 35 U.S.C. 154(b) by 828 days.

(21) Appl. No.: 13/470,869

(22) Filed: May 14, 2012

(65) Prior Publication Data

US 2013/0303176 A1 Nov. 14, 2013

(51) Int. Cl.
*H04W 76/02* (2009.01)
(52) U.S. Cl.
CPC .................. *H04W 76/027* (2013.01)
(58) Field of Classification Search
CPC ........................................... H04W 76/02
USPC .................. 455/450, 435.1–435.3
See application file for complete search history.

(56) References Cited

U.S. PATENT DOCUMENTS

| 8,000,705 | B2 * | 8/2011 | Kim et al. ........... 455/435.1 |
| 2011/0081887 | A1 * | 4/2011 | Chakraborty et al. ...... 455/410 |
| 2011/0190001 | A1 * | 8/2011 | Kodikara Patabandi et al. .............. 455/450 |

OTHER PUBLICATIONS

Meeting Notes 3GPP TSG RAN WG2 Meeting #77bis, Jeju, Korea, Mar. 26-30, 2012, Title"LS on RR failures and network reselection". Emails among members of the 3GPP RAN Working Group 2 discussing the topic of "RAT/PLMN selection upon RRC Connection Reject".
LTE; Evolved Universal Terrestrial Radio Access Network (E-UTRAN); Architecture description (3GPP TS 36.401 version 10.3.0 Release 10).
LTE; Evolved Universal Terrestrial Radio Access (E-UTRA); Radio Resource Control (RRC); Protocol specification (3GPP TS 36.331 version 10.5.0 Release 10).
Meeting Notes 3GPP TSG-RAN WG2 Meeting #77bis, Jeju, South Korea, Mar. 26-30, 2012, Title: "UE reaction on RRC Connection Rejection".
Meeting Notes 3GPP TSG RAN WG2 Meeting #77bis, Jeju, Korea, Mar. 26-30, 2012, Title" LS on RR failures and network reselection".
Emails among members of the 3GPP RAN Working Group 2 discussing the topic of "RAT/PLMN selection upon RRC Connection Reject", Considered Feb. 18, 2016 MTV.
LTE; Evolved Universal Terrestrial Radio Access Network (E-UTRAN); Architecture description (3GPP TS 36.401 version 10.3.0 Release 10), Considered Feb. 18, 2016 MTV.
LTE; Evolved Universal Terrestrial Radio Access (E-UTRA); Radio Resource Control (RRC); Protocol specification (3GPP TS 36.331 version 10.5.0 Release 10), Considered Feb. 18, 2016 MTV.

* cited by examiner

*Primary Examiner* — Michael T Vu
(74) *Attorney, Agent, or Firm* — Oblon, McClelland, Maier & Neustadt, L.L.P.

(57) ABSTRACT

Embodiments include a method by which a network equipment efficiently directs a device attempting a connection to a congested or limited-capacity portion of a network to another resource (e.g., cell, frequency, and/or RAT) where the attempt is more likely to be successful. This method utilizes a connection reject message that comprises a small amount of information pointing to information broadcast in system information (SI) messages. The reject message may be used with existing or, alternately, enhanced SI messages comprising tags that resolve the pointer information in the reject message. Embodiments also include methods by which a device redirects to a resource based on the information contained in the reject and SI messages. Other embodiments include methods by which a device deprioritizes a resource during cell reselection based on information contained in the reject and SI messages. Embodiments include wireless communication devices, network equipment, or computer-readable media embodying these methods.

31 Claims, 11 Drawing Sheets

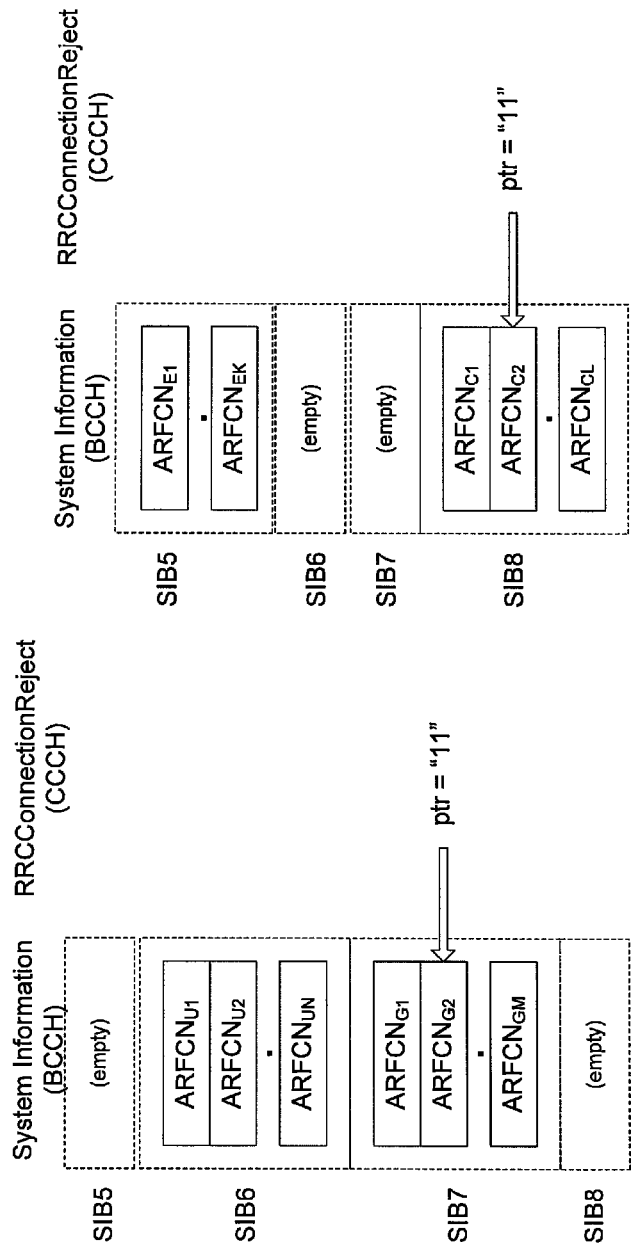

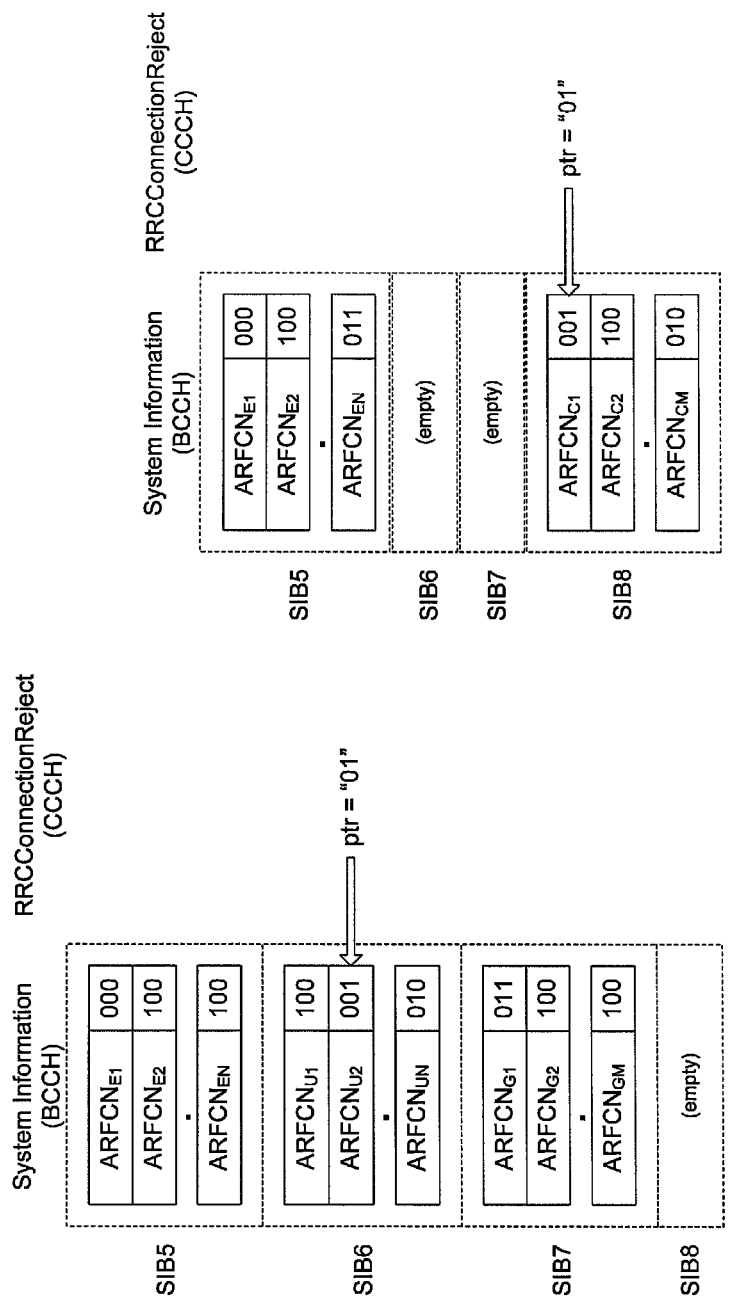

USING POINTERS TO TAGGED FREQUENCIES TO INDICATE CANDIDATES FOR USE IN REDIRECTION OR RESELECTION

TECHNICAL FIELD

The disclosure herein relates to the field of wireless or cellular communications, and more particularly to methods, devices, and network equipment for efficiently redirecting a rejected connection establishment attempt to another cell or radio-access technology (RAT) where it is more likely to be successful.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. These technologies are constantly evolving through what have become known as "generations" of commercial cellular/mobile systems. 3GPP also uses a system of parallel "releases" to provide developers with a stable platform for implementation and to allow for the addition of new features required by the market. Each release includes specific functionality and features that are specified in detail by the version of the 3GPP standards associated with that release.

Universal Mobile Telecommunication System (UMTS) is an umbrella term for the third generation (3G) radio technologies developed within 3GPP and initially standardized in Release 4 and Release 99, which preceded Release 4. UMTS includes specifications for both the UMTS Terrestrial Radio Access Network (UTRAN) as well as the Core Network. UTRAN includes the original Wideband CDMA (W-CDMA) radio access technology that uses paired or unpaired 5-MHz channels, initially within frequency bands near 2 GHz but subsequently expanded into other licensed frequency bands. The UTRAN generally includes node-Bs (NBs) and radio network controllers (RNCs). Similarly, GSM/EDGE is an umbrella term for the second-generation (2G) radio technologies initially developed within the European Telecommunication Standards Institute (ETSI) but now further developed and maintained by 3GPP. The GSM/EDGE Radio Access Network (GERAN) generally comprises base stations (BTSs) and base station controllers (BSCs).

Long Term Evolution (LTE) is another umbrella term for so-called fourth-generation (4G) radio access technologies developed within 3GPP and initially standardized in Releases 8 and 9, also known as Evolved UTRAN (E-UTRAN). As with UMTS and GSM/EDGE, LTE is targeted at various licensed frequency bands including the 700-MHz band in the United States. LTE is accompanied by improvements to non-radio aspects commonly referred to as System Architecture Evolution (SAE), which includes Evolved Packet Core (EPC) network. From the perspective of an end user, one of the most notable features of LTE is much higher data rates than those available in UTRAN or GERAN, which improves the user's experience in many applications including email, audio and video streaming, personal navigation, gaming, etc.

In practice, a plurality of networks using different radio-access technologies (e.g., a GERAN, a UTRAN, an E-UTRAN, and/or a CDMA2000 network) covering substantially the same geographic area may coexist on different frequencies under control of the same network operator. The operator may configure the respective networks such that a user equipment (UE) capable of communicating on any combination of radio-access technologies (i.e., "multi-RAT UE") may transition between the available networks according to certain rules and requirements. As used within the 3GPP standards, "user equipment" or "UE" means any wireless communication device (e.g., smartphone or computing device) that is capable of communicating with GERAN, UTRAN, E-UTRAN, CDMA2000 network or other such network equipment.

Even if networks with multiple radio access technologies (RATs) are available to the multi-RAT UE, it is desirable for the multi-RAT UE to establish and maintain a connection to the E-UTRAN since it provide the user experience benefits described above. However, situations may arise where the UE cannot establish or maintain a connection with the E-UTRAN because it is overly congested. In such cases, the multi-RAT UE must look for service on networks using other RATs.

SUMMARY

Embodiments of the present disclosure include a method by which a network equipment can efficiently direct a device attempting a connection to a congested or limited-capacity portion of a network to immediately reselect a specific combination of cell, frequency, and/or radio-access technology (RAT) where the connection attempt is more likely to be successful. This method utilizes an enhanced RRCConnectionReject message transmitted on a common control channel (CCCH) that comprises a small amount of additional information that points to cell, frequency, and/or RAT information in System Information (SI) messages transmitted on the broadcast control channel (BCCH). In some embodiments, the enhanced RRCConnectionReject message may be used in combination with existing (or "legacy") SI messages. In other embodiments, the enhanced RRCConnectionReject message is used in combination with enhanced SI messages comprising labels ("tags") that resolve the pointer information in the RRCConnectionReject message. Embodiments also include methods by which a device that receives an enhanced RRCConnectionReject message together with a corresponding SI message performs cell selection using a specific combination of cell, frequency, and/or RAT, otherwise known as redirection. Other embodiments include methods by which a device that receives an enhanced RRCConnectionReject message together with a corresponding SI message deprioritizes a specific combination of cell, frequency, and/or RAT during cell reselection. Other embodiments include wireless communication devices (e.g., user equipment or "UE") and network equipment (e.g., evolved Node B or "eNB") embodying one or more of these methods.

Embodiments of the present disclosure also include a method for establishing a connection by a wireless communication device, comprising receiving from a first network equipment a first control channel comprising information identifying at least one additional network equipment; transmitting to the first network equipment on a second control channel a connection request message; receiving from the first network equipment on the second control channel a connection reject message comprising information related to the information identifying the at least one additional network equipment; and determining a second network equipment from the information received on the first and second control channels. Some embodiments further comprise attempting to obtain service on the second network equipment, while some other embodiments further comprise attempting to obtain service from one or more network equipment identified by the information received from the first control channel, and assigning the lowest priority to the second network equipment during the attempting to obtain service. In some embodiments, the information identifying at least one additional network equipment comprises at least one neighbor list and the information related to the information identifying the at least one additional network equipment comprises a pointer to an entry in the at least one neighbor list. Embodiments include a wireless communication device and a computer-readable medium with program code embodying one or more of these methods.

Embodiments of the present disclosure also include a method for a network equipment to process a request to establish a connection made by a device, comprising transmitting on a first control channel information identifying at least one additional network equipment; receiving on a second control channel a connection request message sent by the device; determining that the connection requested cannot be supported; and transmitting to the device on the second control channel a connection reject message comprising information related to the information identifying the at least one additional network equipment. In some embodiments, the combination of the information identifying at least one additional network equipment and the information related to the information identifying at least one additional network equipment relates to one of (a) a candidate network equipment from which the device should attempt to obtain service, and (b) a candidate network equipment that the device should deprioritize when attempting to obtain service. In some embodiments, the information identifying at least one additional network equipment comprises at least one neighbor list and the information related to the information identifying the at least one additional network equipment comprises a pointer to an entry in the at least one neighbor list. Embodiments include a network equipment and a computer-readable medium with program code embodying one or more of these methods.

DESCRIPTION OF THE DRAWINGS

The detailed description will refer to the following drawings, wherein like numerals refer to like elements, and wherein:

FIGS. 7A and 7B are block diagrams showing exemplary contents of System Information and RRCConnectionReject messages according to one or more other embodiments of the present disclosure;

FIGS. 8A and 8B are block diagrams showing exemplary contents of System Information and RRCConnectionReject messages according to one or more other embodiments of the present disclosure;

DETAILED DESCRIPTION

Figure 1:
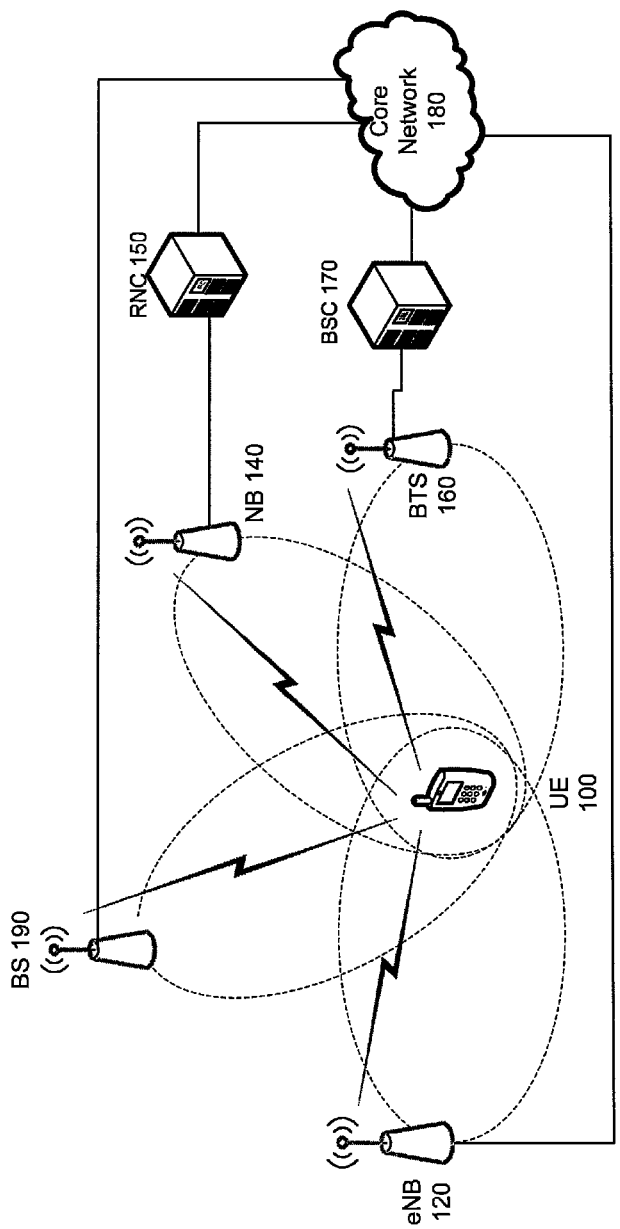
FIG. 1 is a high-level block diagram of an exemplary network comprising GERAN, UTRAN, E-UTRAN, and CDMA2000 technologies.

An exemplary network comprising GERAN, UTRAN, E-UTRAN, and CDMA2000 technologies is shown in FIG. 1. User equipment (UE) 100 is capable of communicating with a plurality of Evolved Node B (eNB) 120, Node B (NB) 140, Base Transceiver Station (BTS) 160, and Base Station (BS) 190. Each of eNB 120, NB 140, BTS 160, and BS 190 serves UEs in a limited geographic area, commonly known as a "cell", denoted by the respective dashed ovals in FIG. 1. eNB 120 is responsible for all radio-related functions in the E-UTRAN, including radio bearer control, radio admission control, radio mobility control, scheduling, and dynamic allocation of resources to UEs in uplink and downlink. The combination of NB 140 and Radio Network Controller (RNC) 150 is responsible for all radio-related functions in the UTRAN, while the combination of BTS 160 and Base Station Controller (BSC) 170 is responsible for all radio-related functions in the GERAN. BS 190 is responsible for radio-related, functions in the CDMA2000 network. Each of eNB 120, NB 140, BTS 160, and BS 190 are connected to core network 180. In the case of E-UTRAN, eNB 120 connects directly to core network 180, while NB 140 and BTS 160 connect to core network 180 via RNC 150 and BSC 170, respectively. BS 190 may connect to core network 180 directly or via intervening hardware, according to implementation options known to persons of ordinary skill in the art.

Although FIG. 1 shows a GERAN, UTRAN, E-UTRAN, and CDMA2000 network each comprising only a single cell, this is merely for purposes of illustration and the person of ordinary skill will understand that any or all of these radio access networks may include multiple cells comprising multiple eNBs, NBs, BTSs, or BSs, as the case may be. Moreover, although FIG. 1 shows four different types of networks, this is merely for purposes of illustration and less than four different types of networks may be present within the spirit and scope of the present disclosure. For example, some embodiments of the present disclosure may be used in situations involving only an E-UTRAN and a CDMA2000 network, while other embodiments may be used in situations involving only an E-UTRAN and one or more of a UTRAN and a GERAN. By the same token, exemplary multi-RAT UEs include those configured to operate with E-UTRAN and CDMA2000 technologies, as well those configured to operate with E-UTRAN and one or more of UTRAN and GERAN technologies.

Similarly, although core network 180 is shown as a single entity, persons of ordinary skill will understand that it may comprise different sets of functionality corresponding to different respective radio access networks. For example, core network 180 may include the EPC corresponding to the E-UTRAN. The EPC includes the Mobility Management Entity (MME) that processes the signaling protocols between the UE and the EPC, which are known as the Non Access Stratum (NAS) protocols. The EPC also includes the Serving Gateway (SGW), which handles Internet Protocol (IP) data packets between the UE and the EPC, and serves as the local mobility anchor when the UE moves between multiple eNBs (not shown in FIG. 1) in the E-UTRAN. Likewise, core network 180 may include the SGSN/GGSN functionality that enables UEs to transmit data packets via the UTRAN and GERAN. The GGSN is responsible for the interworking between core network 180 and external packet switched networks (e.g., the Internet). The SGSN is responsible for the delivery of IP data packets to and from the UEs within its geographical service area via the UTRAN and GERAN. Core network 180 may include interface functionality, known to persons of ordinary skill in the art, that enables MMEs, SGWs, GGSNs, SGSNs, and the like to interoperate and/or be under common control.

Each of eNB 120, NB 140, and BTS 160 may transmit a Broadcast Control Channel (BCCH) on a predetermined combination of frequency, timeslot, and/or channelization spreading code, depending on the particular radio access technology. Each BCCH includes various System Information (SI) messages intended for all UEs within the area of the cell served by that particular eNB, NB, or BTS, as the case may be. For example, if multi-RAT UE 100 is within cell areas of eNB 120, NB 140, and BTS 160, and is configured to operate on the frequencies used by eNB 120, NB 140, and BTS 160, UE 100 may receive the three respective BCCHs and decode the SI messages that they carry.

System Information transmitted on the respective BCCHs is divided into the Master Information Block (MIB) and a number of System Information Blocks (SIBs). The MIB includes a limited number of most essential and most frequently transmitted parameters that are needed to acquire other information related to the cell. SIBs other than SystemInformationBlockType1 are carried in SystemInformation (SI) messages and mapping of SIBs to SI messages may be predetermined or flexibly configured by information included in SystemInformationBlockType1. For example, SystemInformationBlockType3 transmitted by eNB 120 contains cell re-selection information that is common for all intra-frequency, inter-frequency, and/or inter-RAT cell re-selection procedures (i.e., applicable for more than one type of cell re-selection but not necessarily all).

SystemInformationBlockType5 contains information specific to inter-frequency cell re-selection within the E-UTRAN, i.e., other frequencies transmitted by eNB 120 and neighboring eNBs. This may include a so-called "neighbor list" of E-UTRAN cells and frequencies that UE 100 is allowed to use—or banned from using—for service. By the same token, SystemInformationBlockType6 contains information specific to inter-RAT cell re-selection into the UTRAN, e.g., a neighbor list of UTRAN cells and their frequencies that UE 100 may (or may not) use for cell re-selection. SystemInformationBlockType6 may include information identifying NB 140. Likewise, SystemInformationBlockType7 contains information specific to inter-RAT cell re-selection into the GERAN, e.g., a neighbor list of GERAN cells and their frequencies UE 100 may use for cell re-selection. SystemInformationBlockType7 may include information identifying BTS 160. Also, SystemInformationBlockType8 contains information specific to inter-RAT cell re-selection into a CDMA200 network, e.g., a neighbor list of CDMA2000 cells and their frequencies UE 100 may use for cell re-selection, provided that UE 100 is configured to operate according to CDMA2000 standards. SystemInformationBlockType8 may include information identifying BS 190. By receiving and processing these and other SI messages, UE 100 can determine a complete list of neighboring cells and frequencies that are available for re-selection in case it cannot obtain or maintain service from its preferred cell, e.g., eNB 120 in E-UTRAN.

Figure 2A:
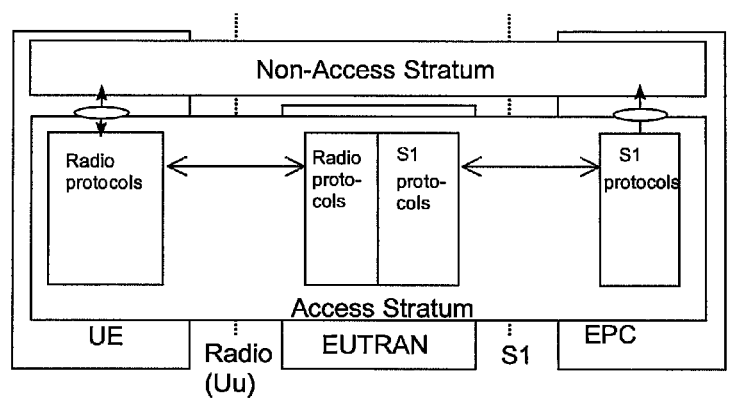
FIG. 2A is a high-level block diagram of the E-UTRAN architecture in terms of its constituent components, protocols, and interfaces.

FIG. 2A is a high-level block diagram of LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

Figure 2B:
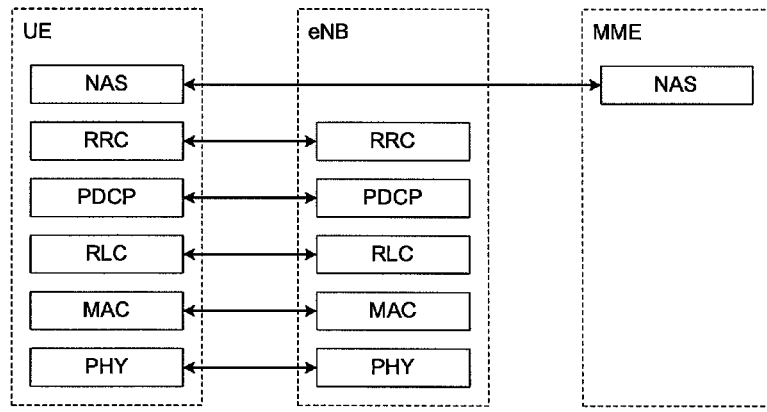
FIG. 2B is a block diagram of the protocol layers of the control-plane portion of the radio (Uu) interface between a user equipment (UE) and the E-UTRAN.

FIG. 2B is a block diagram of the C-plane protocol stack on the Uu interface Physical (PHY), Medium Access Control (MAC), Radio Link Control (RLC), Packet Data Convergence Protocol (PDCP), and Radio Resource Control (RRC) layers. Medium Access Control (MAC), Radio Link Control (RLC), Packet Data Convergence Protocol (PDCP), and Radio Resource Control Protocol. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

Figure 3A:
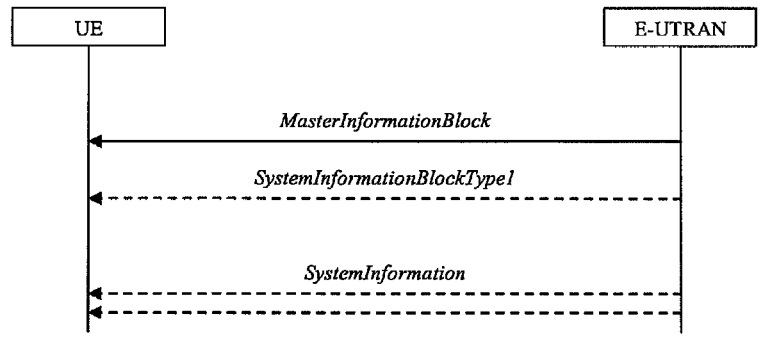
FIG. 3A is an exemplary signal flow diagram showing UE reception of System Information (SI) messages broadcast by an E-UTRAN.
Figure 3B:
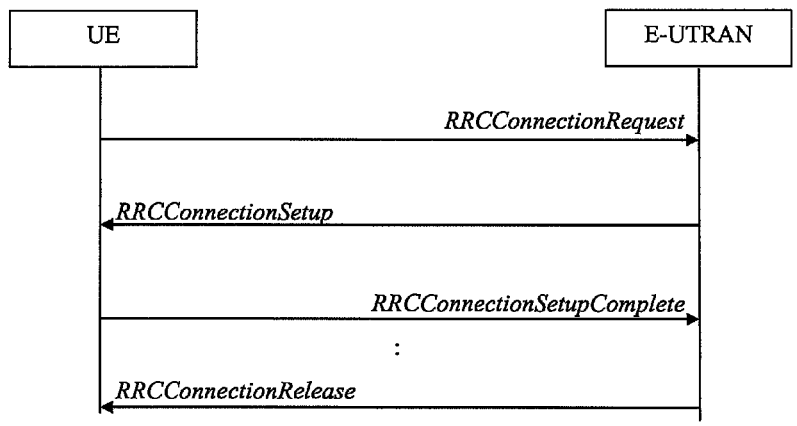
FIG. 3B is an exemplary signal flow diagram illustrating the successful establishment of a connection between a UE and an E-UTRAN.

The RRC layer provides a variety of C-plane services including broadcast of system information (SI); paging; security key management; and establishment, maintenance, and release of connections between a UE and an E-UTRAN. As described above, and illustrated in FIG. 3A, a UE may receive various SI messages via the BCCH transmitted by the eNB serving the cell where the UE is located. After the UE receives and processes these SI messages, it may attempt to establish a connection with its serving eNB, e.g., for sending data packets. FIG. 3B shows an exemplary signal flow diagram for the case where the establishment of a connection between the UE and E-UTRAN is successful. When a UE desires to establish a connection to the E-UTRAN, it sends an RRCConnectionRequest message to its serving eNB. The RRCConnectionRequest message may include the reason why the UE is attempting to establish the connection (i.e., the "establishment cause") as well as an identifier for the UE. The UE may send the RRCConnectionRequest message using a Common Control Channel (CCCH) shared by all UEs in the same cell.

In the case shown in FIG. 3B, the eNB responds to the RRCConnectionRequest message with a RRCConnectionSetup message (also sent on the CCCH) that includes information about the radio resources assigned by the eNB for the requested connection. After configuring its radio resources in accordance with this assignment, and performing various other tasks, the UE responds to the eNB by sending (also on the CCCH) a RRCConnectionSetupComplete message that confirms the establishment of the connection. Since the CCCH is a common, limited-capacity resource, the RRC messages transmitted on the CCCH are optimized for small size to maximize the number of UEs that can be supported on in a single cell. For example, RRCConnectionRequest, RRCConnectionSetup, and RRCConnectionSetupComplete messages may be arranged such that only the most critical fields are included.

Optionally, after some period of time, the eNB may determine that it can no longer maintain the connection previously established with the UE. In that event, the eNB sends an RRCConnectionRelease message instructing the UE to release the connection. This message, which is sent on a dedicated control channel (DCCH), may include information identifying other cells and/or frequencies for which the UE may attempt to re-establish the connection by process of re-selection. This information may include other cells (or eNBs) in the E-UTRAN ("intra-RAT re-selection") as well as other cells in a GERAN, UTRAN, or CDMA2000 network. Because the RRCConnectionRelease message is sent on a DCCH, it does not have the same size constraints as the RRC messages sent on the CCCH.

Figure 3C:
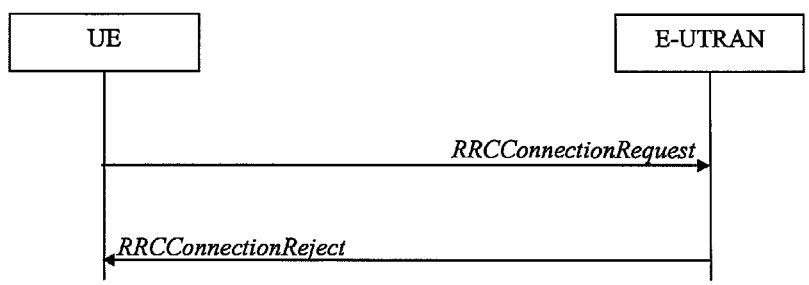
FIG. 3C is an exemplary signal flow diagram illustrating the unsuccessful attempt to establish a connection between a UE and an E-UTRAN.

In contrast, FIG. 3C shows an exemplary signal flow diagram for the case where the establishment of a connection between the UE and E-UTRAN is unsuccessful. As described above, the UE sends an RRCConnectionRequest message to its serving eNB using a CCCH. The RRCConnectionRequest message may include the reason why the UE is attempting to establish the connection (i.e., the "establishment cause") as well as an identifier for the UE. The eNB is not able to accept the requested connection, e.g., because it is overly congested. In this case, the eNB responds to the RRCConnectionRequest message with an RRCConnectionReject message, also sent on the CCCH. The RRCConnectionReject message may include a "wait time" for which the UE must wait before attempting to establish the connection again. Upon receiving this message, the UE sets an internal timer to the "wait time" value and, after the timer expires, again attempts to establish the connection by sending an RRCConnectionRequest message. If the eNB is still unable to establish the connection, it will respond with another RRCConnectionReject message specifying a "wait time." As a result, during periods of congestion, the UE may get stuck in a loop until it successfully establishes an RRC connection, during which time it is neither able to get service from the E-UTRAN nor to establish a connection with another network, such as a GERAN, a UTRAN, or a CDMA2000 network.

One possible solution to this problem is to include in the RRCConnectionReject message similar information as found in the RRCConnectionRelease message, namely information identifying other cells, frequencies, and/or networks for which the UE may attempt to re-establish the connection by process of redirection or re-selection. This approach would enable the UE to obtain service more quickly and would eliminate the additional message traffic on the CCCH due to repeated connection attempts. Since the RRCConnectionReject message is sent on the CCCH, however, it is subject to the size constraints described above. The information identifying other cells and/or frequencies for redirection or re-selection is relatively large in size, and including it in the RRCConnectionReject message—or any other message sent on the CCCH—would cause an unacceptable decrease in CCCH capacity.

Another prior art solution to this problem, discussed in 3GPP contribution 82-121063, involves limiting the number of RRC connection attempts rather than adding information to the RRCConnectionReject message. In this approach, the UE counts the number of failed attempts to connect to an E-UTRAN. Once it reaches a maximum value (e.g., five), the UE can transition to a different state that permits reselection of a different network and/or RAT. One major drawback with this approach, however, is that five failed connection attempts still requires a substantial waiting period, during which the UE cannot obtain a connection from any network.

Another proposed prior art solution to this problem, discussed in 3GPP contribution R2-121118, involve barring certain classes of UEs from accessing the particular congested cell. Although the barred UEs are likely to find service in another cell and/or frequency in the E-UTRAN or another network, based on the neighbor list(s) in the broadcast SI messages, this solution may have the effect of extending the congestion problem to one or more other cells in the neighbor lists. Moreover, it does not give the network operator sufficient granularity of control for solving the congestion problem, since it re-directs all UEs to the same destination(s).

Another prior art solution to this problem involves adding a small amount of information to the RRCConnectionReject message that instruct the rejected UE to stop attempting to establish a connection with the current eNB. For example, one bit can be used to instruct the UE to attempt re-selection but to deprioritize its current frequency, while another bit can be used to inform the UE to deprioritize its current RAT, e.g., E-UTRAN. Although this solution does not significantly reduce the CCCH capacity, it may suffer from the same drawbacks as access barring, namely extending the congestion problem and lack of granularity of control.

Embodiments of the present disclosure include a method by which a network equipment (e.g., an eNB) can efficiently direct a device (e.g., a UE) attempting a connection to a congested or limited-capacity portion of a network to immediately reselect a specific combination of cell, frequency, and/or RAT where the connection attempt is more likely to be successful. This method utilizes an enhanced RRCConnectionReject message transmitted on a CCCH that comprises a small amount of additional information that points to cell, frequency, and/or RAT information in System Information (SI) messages transmitted on the BCCH). In some embodiments, the enhanced RRCConnectionReject message may be used in combination with existing (or "legacy") SI messages. In other embodiments, the enhanced RRCConnectionReject message is used in combination with enhanced SI messages comprising labels ("tags") that resolve the pointer information in the RRCConnectionReject message. Embodiments also include methods by which a device that receives an enhanced RRCConnectionReject message together with a corresponding SI message performs redirection to a specific combination of cell, frequency, and/or RAT. Other embodiments include methods by which a device that receives an enhanced RRCConnectionReject message together with a corresponding SI message deprioritizes a specific combination of cell, frequency, and/or RAT during cell reselection. Other embodiments include wireless communication devices (e.g., UEs) or network equipment (e.g., eNBs) embodying one or more of these methods.

Figure 4:
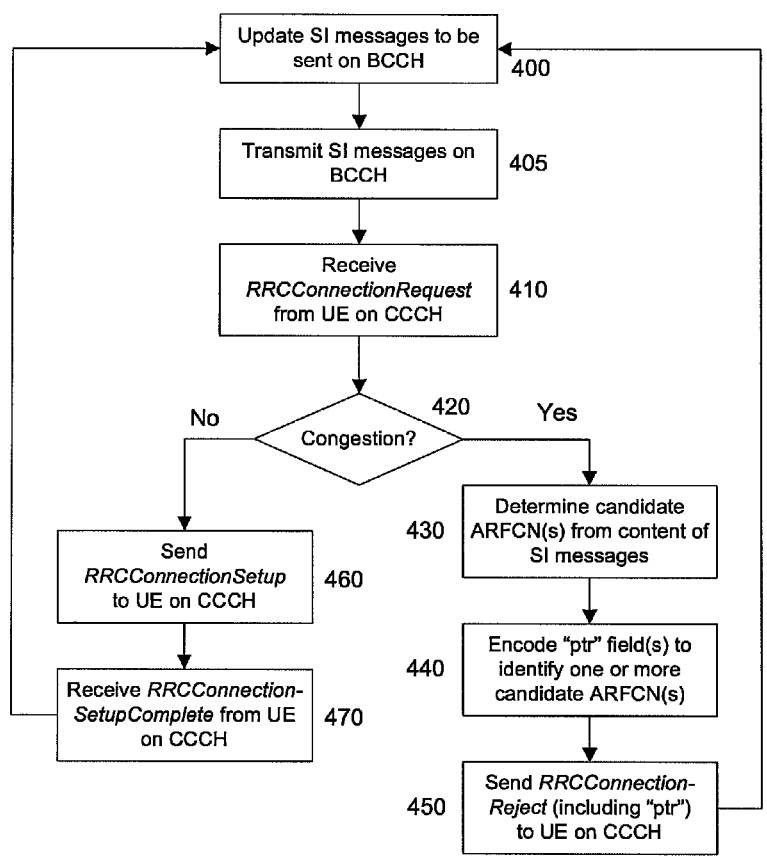
FIG. 4 is a flowchart of an exemplary method in a network equipment, such as an eNB, in an E-UTRAN, according to one or more embodiments of the present disclosure.

FIG. 4 is a flowchart of an exemplary method for network equipment, such as an eNB in an E-UTRAN, according to one or more embodiments of the present disclosure. The network equipment is capable of transmitting System Information (SI) messages on a broadcast control channel (BCCH) and of establishing connections with various devices (e.g., UEs) by exchanging Radio Resource Control (RRC) messages according to established protocols. In block 400, the network equipment updates the content of the SI messages that it plans to send on the BCCH. This updating may comprise, for example, updating neighbor lists corresponding to frequency channels (i.e., Absolute Radio Frequency Channel numbers or "ARFCNs") that devices can use for reselection while in idle (non-connection) mode. The term "ARFCN" is used herein generically to refer to frequency channels in E-UTRAN, UTRAN, GERAN, and CDMA2000 networks, which may be known individually as EARFCN, UARFCN, GARFCN, and CARFCN, respectively, or other terms familiar to persons or ordinary skill in the art.

In some embodiments, this updating in block 400 may comprise adding certain additional information that identifies ARFCNs corresponding to a plurality of redirection candidates in case that a device is unable to establish a connection with the network equipment. In other embodiments, this updating may comprise adding certain additional information that identifies ARFCNs that a device should deprioritize during cell reselection in the event that it is unable to establish a connection with the network equipment. In block 405, the network equipment begins transmitting the BCCH comprising the updated SI messages.

In block 410, the network equipment receives an RRCConnectionRequest message on the common control channel (CCCH) from a device that is attempting to establish a connection. In block 420, the network equipment evaluates whether or not it has sufficient remaining transmission and/or reception capacity to support the requested connection, i.e., does congestion exist. If the network equipment determines that no congestion exists, in block 460 it sends an RRCConnectionSetup message to the device on the CCCH indicating the grant and configuration of the requested connection. Once the network equipment receives an RRCConnectionSetupComplete message from the device in block 470 acknowledging the connection, it returns to block 400 where it continues transmitting the BCCH on a regular basis, updating the SI messages as necessary according to conditions in the network.

On the other hand, if the network equipment determines in block 420 that congestion exists, in some embodiments it then determines in block 430 one or more redirection candidate ARFCNs from among the ARFCNs included in the neighbor lists or, in some embodiments, additional information specifically related to redirection candidates. In other embodiments, the network equipment determines in block 430 one or more candidate ARFCNs that the device should deprioritize during cell reselection, either from among the ARFCNs included in the neighbor lists or from additional information specifically related to low-priority ARFCNs. In some embodiments, the RRCConnectionRequest message may include information indicating which of the candidates indicated in the broadcast SI message that the device supports. In block 440, the network equipment encodes a pointer variable, "ptr", to identify the candidate ARFCN, taking into account available information in the RRCConnectionRequest message. In some embodiments, "ptr" is encoded with a minimal number of bits. In some embodiments, the network equipment may provide multiple "ptr" variables or fields in the RRCConnectionRequest message, each of which points to a candidate ARFCN.

In step 450, the network equipment sends an RRCConnectionReject message to the device on CCCH. This message indicates that the network equipment is unable to establish the requested connection and includes one or more "ptr" variables or fields, each of which identifies a candidate ARFCN. In some embodiments, the one or more "ptr" values identify respective redirection candidate ARFCNs with which the device can try to establish the desired connection. In other embodiments, the one or more "ptr" variables or fields identify respective candidate ARFCNs that the device should deprioritize during cell reselection. Subsequently, the network equipment returns to block 400 where it continues transmitting the BCCH on a regular basis, updating the SI messages as necessary according to conditions in the network.

Figure 5A:
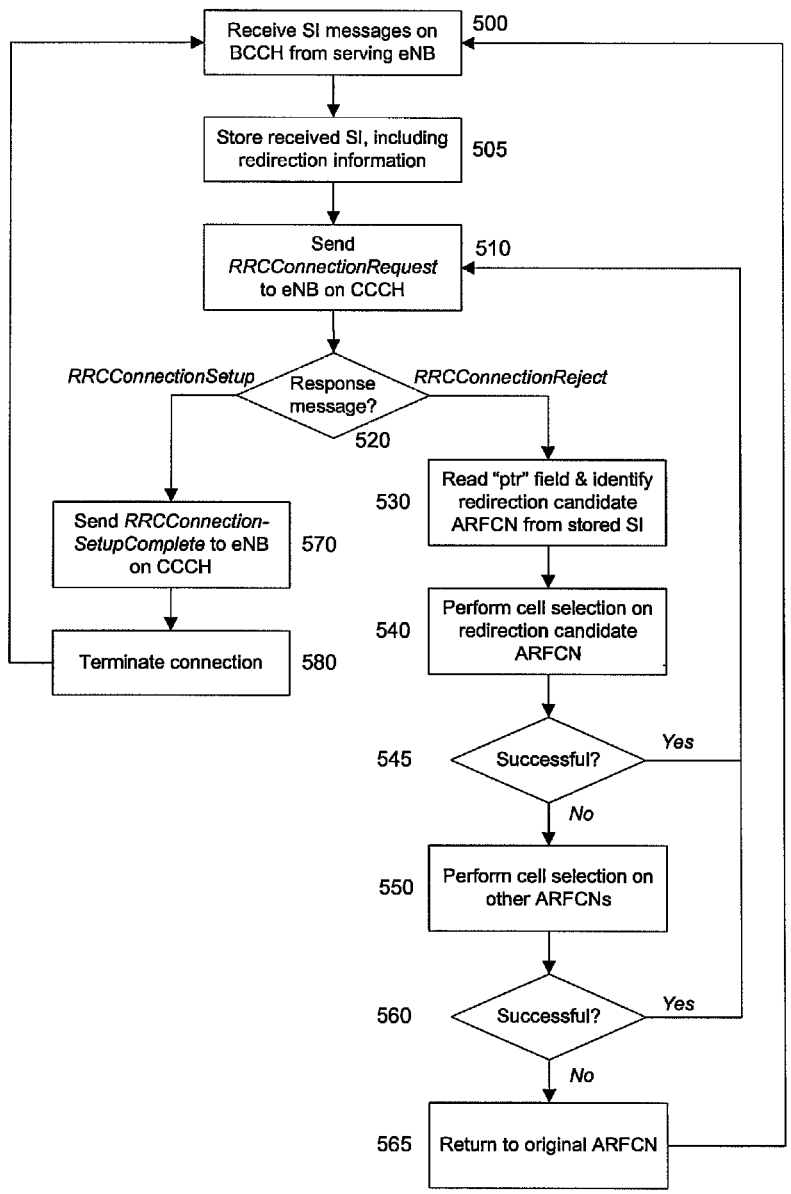
FIGS. 5A and 5B are flowcharts of exemplary methods in a wireless communication device, such as a UE, according to embodiments of the present disclosure.
Figure 5B:
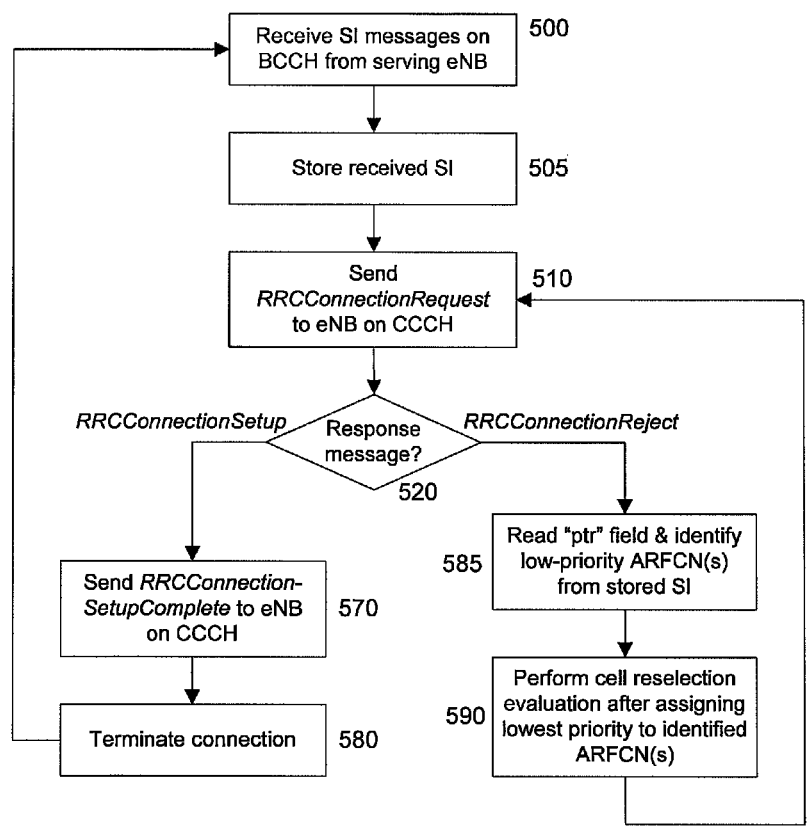

FIGS. 5A and 5B are flowcharts of exemplary methods for a wireless communication device, such as a UE, according to one or more embodiments of the present disclosure. Unless otherwise specified, blocks in both FIGS. 5A and 5B bearing the same label and number perform the same function. The device is capable of receiving SI messages on a BCCH and of establishing connections with various network equipment (e.g., eNBs) by exchanging Radio Resource Control (RRC) messages according to established protocols. In block 500, the device receives SI messages on the BCCH transmitted by the eNB serving the cell in which the device is located. These SI messages may comprise, for example, neighbor lists corresponding to frequency channels (ARFCNs) in nearby E-UTRAN, UTRAN, GERAN, and CDMA2000 networks that the device can use for reselection while in idle (non-connection) mode. In some embodiments, the SI messages may comprise certain additional information that identifies a plurality of candidate ARFCNs in the event that the device is unable to establish a connection with the eNB serving that cell. In some embodiments, the candidate ARFCNs comprise a plurality of redirection candidate ARFCN. In other embodiments, the candidate ARFCNs comprise a plurality of ARFCNs that the device should deprioritize during cell reselection. In block 505, the device stores the received SI including the neighbor lists and any additional information related to candidate ARFCNs.

In block 510, when the device wants to establish a connection with the eNB (e.g., for sending data packets), it sends an RRCConnectionRequest message to the eNB on the CCCH according to an established format. In some embodiments, the device may include in the RRCConnectionRequest message information indicating which of the candidate ARFCNs and/or RATs indicated in the broadcast SI message that the device supports. In block 520, the device receives a response to the RRCConnectionRequest message from the eNB and evaluates its contents. If the response message is an RRCConnectionSetup message indicating that the eNB is able to establish the requested connection, the device proceeds to block 560 where it sends an RRCConnectionSetupComplete message to the eNB, via the CCCH, acknowledging the connection establishment. In block 570, at some future time, the device may terminate the established connection. Alternately, the eNB may terminate the connection. In any event, the device proceeds to block 580 where it continues to receive SI messages on the BCCH, either periodically or occasionally.

Referring now to FIG. 5A, if the device determined in block 520 that the response message is an RRCConnectionReject message indicating that the eNB is unable to establish the requested connection, the device proceeds to block 530 where it reads the one or more "ptr" variables or fields in this received message. The device uses the combination of the one or more "ptr" variables or fields and the received SI stored in block 505 to identify one or more redirection candidate ARFCNs. These one or more redirection candidates may be ARFCN(s) in a neighboring E-UTRAN, UTRAN, GERAN, or CDMA2000 network. In block 540, the device tunes its radio transceiver to the one of candidate ARFCNs determined in block 530 and performs cell selection. This may include, for example, determining the highest-quality cell using that candidate ARFCN and whether the signal quality for that cell is good enough to obtain service, reading SI messages on the BCCH to determine if the UE is barred from using that cell, etc. This process may be repeated in block 540 for each of the candidate ARFCNs determined in block 530. In block 545, it is determined whether redirection in block 540 has been successful for any of the one or more candidate ARFCNs identified in block 530 and evaluated in block 540. If so, the device proceeds to step 510 where it sends another RRCConnectionRequest using the CCCH of the reselection candidate ARFCN, which may be provided by an E-UTRAN, UTRAN, GERAN, or CDMA2000 network as the case may be.

If redirection has not been successful, the device proceeds to block 550 where it performs cell selection (described above with respect to block 540) for other ARFCNs than those identified by the one or more "ptr" variables or fields. In block 555, it is determined whether the cell selection has been successful for any of the ARFCNs evaluated in block 540. If so, the device proceeds to block 510 where it sends another RRCConnectionRequest using the CCCH of the ARFCN corresponding to successful cell selection, which may be provided by an E-UTRAN, UTRAN, GERAN, or CDMA2000 network as the case may be. If not, in block 555 the device returns to the original ARFCN and then returns to block 500.

FIG. 5B illustrates an alternate embodiment of the method illustrated in FIG. 5A, in which information in the SI messages received in block 500 and stored in block 505 identifies a plurality of ARFCNs that the device should deprioritize during cell reselection. In block 520, the device receives a response to the RRCConnectionRequest message from the eNB and evaluates its contents. If the response message is an RRCConnectionSetup message indicating that the eNB is able to establish the requested connection, the device proceeds as described above in reference to FIG. 5A. On the other hand, if the device determines in block 520 that the response message is an RRCConnectionReject message indicating that the eNB is unable to establish the requested connection, the device proceeds to block 585 where it reads the one or more "ptr" variables or fields in this received message. In this embodiment, the device uses the combination of the one or more "ptr" variables or fields and the received SI stored in block 505 to identify one or more ARFCNs that the device should deprioritize during cell reselection. In block 590, the device assigns the lowest priority to the ARFCN(s) identified in block 585 then performs cell reselection evaluation. Upon identifying a suitable ARFCN during cell reselection, the device proceeds to step 510 where it sends another RRCConnectionRequest using the CCCH of the suitable ARFCN, which may be provided by an E-UTRAN, UTRAN, GERAN, or CDMA2000 network as the case may be.

FIGS. 6 through 9 are block diagrams showing exemplary contents of E-UTRAN System Information (SI) and RRCConnectionReject messages according to several embodiments of the present disclosure. Within these figures, "SIBx" is an abbreviation for SystemInformationBlockType"x", described above, where "x" is a number. For example, "SIB5" is an abbreviation for SystemInformationBlockType5. Although the dashed boxes represent the information within each SIB (e.g., neighbor lists) relevant to present disclosure, persons of ordinary skill will recognize that the particular information shown is merely exemplary and either individual SIBs, or the SI message as a whole, may contain additional information. Each of FIGS. 6A-6B, 7A-7B, and 8A-8B show an SI message including SIB5, SIB6, SIB7, and SIB8, which comprise neighbor lists for E-UTRAN, UTRAN, GERAN, and CDMA2000 networks, respectively. In cases where a particular RAT is not present—or is inaccessible—in neighboring cells, this is indicated by the corresponding SIB being labeled as "(empty)".

Figure 6A:
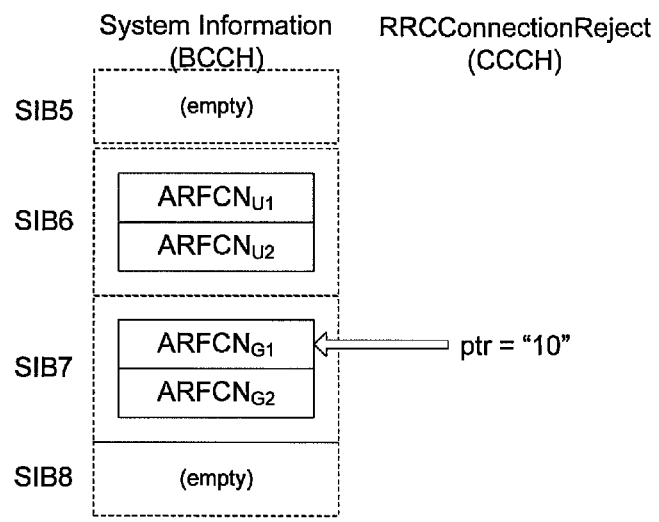
FIGS. 6A and 6B are block diagrams showing exemplary contents of System Information and RRCConnectionReject messages according to one or more embodiments of the present disclosure.
Figure 6B:
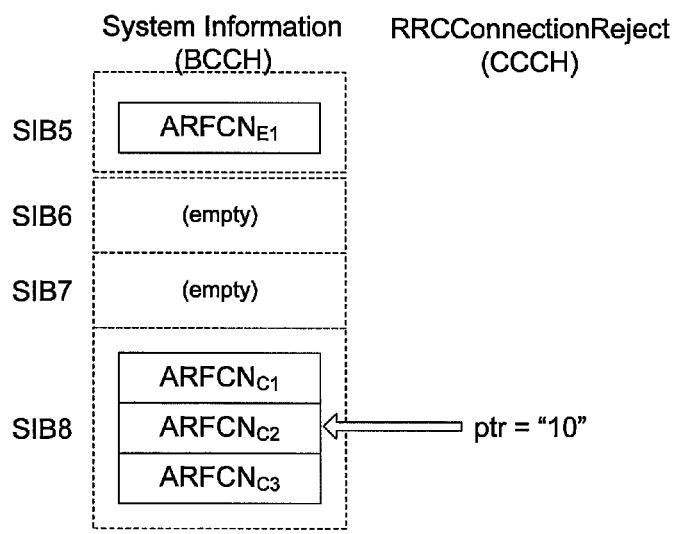

FIGS. 6A-6B illustrate an embodiment of the present disclosure that is operable without requiring changes to existing (or "legacy") SI messages used on an E-UTRAN BCCH. When rejecting a device's (e.g., a UE's) connection establishment attempt, the eNB sends a "ptr" value that the device interprets as an index or pointer into the various neighbor lists of ARFCNs in the order of their appearance in the SI message. A "ptr" value of N is interpreted as a pointer to the $(N+1)^{th}$ ARFCN in order of appearance. In FIG. 6A, the SIB6 neighbor list contains two UTRAN ARFCNs, $ARFCN_{U1}$ and $ARFCN_{U2}$, while the SIB7 neighbor list contains two GERAN ARFCNs, $ARFCN_{G1}$ and $ARFCN_{G2}$. The neighbor lists for E-UTRAN and CDMA2000 in SIB5 and SIB8, respectively, are empty. In this case, the eNB sends a two-bit "ptr" value of 2 ("10" binary) which the UE interprets as a pointer to the third-appearing ARFCN, i.e., $ARFCN_{G1}$.

FIG. 6B provides another example illustrating the operation of this embodiment. The SIB5 neighbor list contains one E-UTRAN ARFCNs—$ARFCN_{E1}$—while the SIB8 neighbor list contains three CDMA2000 ARFCNs—$ARFCN_{C1}$, $ARFCN_{C2}$, and $ARFCN_{C3}$. The neighbor lists for UTRAN and GERAN in SIB6 and SIB7, respectively, are empty. In this case, the eNB sends a two-bit "ptr" value of 2 ("10" binary) which the UE interprets as a pointer to the third-appearing ARFCN, i.e., $ARFCN_{C1}$. The size of "ptr" in this embodiment can be adjusted as desired to achieve the proper granularity in reselection control without overly impacting the capacity of the CCCH. For example, a four-bit "ptr" would allow the operator to identify one of up to 16 candidate ARFCNs to individual devices.

FIGS. 7A and 7B illustrate another embodiment of the present disclosure that also is operable without requiring changes to existing (or "legacy") SI messages used on an E-UTRAN BCCH. When rejecting a device's (e.g., a UE's) connection establishment attempt, the eNB sends a "ptr" value that the device interprets partially as an index or pointer to a particular neighbor (i.e., a particular RAT) and partially as an index or pointer to an ARFCN within that neighbor list—both in the order of appearance in the SI message. A "ptr" value of "AB" (binary) is interpreted as a pointer to the $(A+1)^{th}$ neighbor list appearing in the SI message and the $(B+1)^{th}$ ARFCN in order of appearance on the $(M+1)^{th}$ neighbor list.

In FIG. 7A, the SIB6 neighbor list contains N UTRAN ARFCNs while the SIB7 neighbor list contains M GERAN ARFCNs. Neighbor lists for E-UTRAN and CDMA2000 in SIB5 and SIB8, respectively, are empty. In this case, the eNB sends a two-bit "ptr" value of 2 ("11" binary) which the device interprets as a pointer to the second-appearing neighbor list (i.e., SIB7 for GERAN) and the second-appearing ARFCN in that list (i.e., $ARFCN_{G2}$).

FIG. 7B provides another example illustrating the operation of this embodiment. The SIB5 neighbor list contains K E-UTRAN ARFCNs while the SIB8 neighbor list contains L CDMA2000 ARFCNs. The neighbor lists for UTRAN and GERAN in SIB6 and SIB7, respectively, are empty. In this case, the eNB sends a two-bit "ptr" value of 2 ("11" binary) which the device interprets as a pointer to the second-appearing neighbor list (i.e., SIB7 for GERAN) and the second-appearing ARFCN in that list (i.e., $ARFCN_{G2}$). The size of "ptr" in this embodiment also can be adjusted as desired to achieve the proper granularity in network control without overly impacting the capacity of the CCCH. For example, a four-bit "ptr" would allow the operator to identify one of up to four SIB neighbor lists and one of up to four candidate ARFCNs on each neighbor list—sixteen in total.

FIGS. 8A-8B illustrate an embodiment of the present disclosure that is operable with changes to existing SI messages used on an E-UTRAN BCCH. In particular, each ARFCN in the respective neighbor lists in SIB5-SIB8 are augmented with a "tag" field that identifies whether or not that particular ARFCN can be used as a candidate and, if so, provides an index value that the device can match to the "ptr" value included in an RRCConnectionReject message. In FIGS. 8A and 8B, the "tag" is a three-bit value, with the most significant bit indicating whether or not that particular ARFCN can be used as a candidate and the two least-significant bits providing the index. For example, in FIG. 8A, $ARFCN_{U2}$ in SIB6 has a tag value of "001" indicating that it can be used as a candidate with a "1" index. ARFCNs with tag values of "100" (e.g., $ARFCN_{U1}$) are not usable as candidates for redirection or deprioritizing during reselection. The device receives and stores the SI message shown in FIG. 8A. When the device receives RRCConnectionReject message with a "ptr" value of "01", it compares it to the stored SI and chooses $ARFCN_{U2}$ as a candidate.

As further illustration of this embodiment, FIG. 8B shows a SI message in which the only non-empty neighbor lists are those corresponding to E-UTRAN (SIB5) and CDMA2000 (SIB8). The device receives and stores this SI message. When the device receives RRCConnectionReject message with a "ptr" value of "01", it compares it to the stored SI and chooses $ARFCN_{C2}$ as a candidate. Persons of ordinary skill in the art will recognize that the number and arrangement of the bits in the "tag" of FIGS. 8A and 8B are merely exemplary, and that the "tag" may comprise greater or less than three bits arranged in various orders (e.g., least significant bit indicating whether or not that particular ARFCN can be used as a candidate).

Figure 9A:
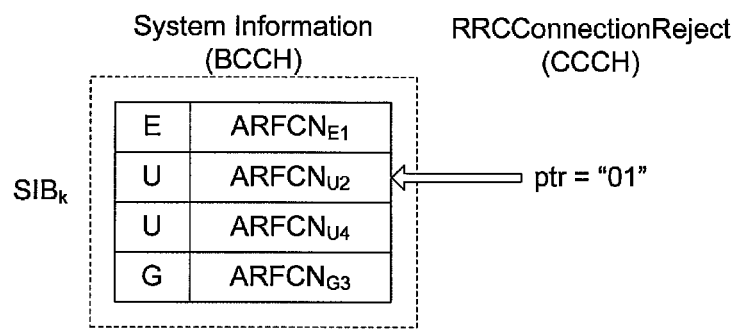
FIGS. 9A and 9B are block diagrams showing exemplary contents of System Information and RRCConnectionReject messages according to one or more other embodiments of the present disclosure.
Figure 9B:
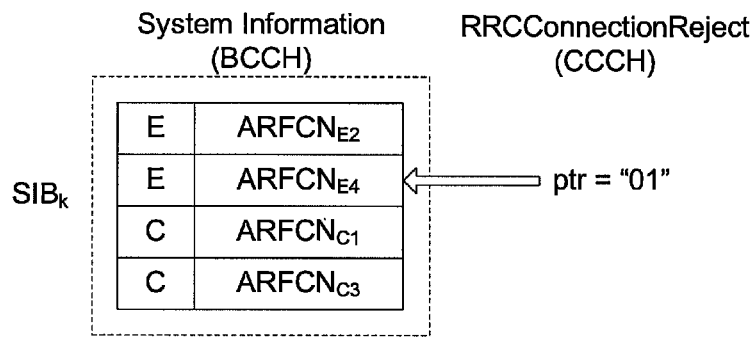

FIGS. 9A-9B illustrate an embodiment of the present disclosure that is operable with changes to existing SI messages used on an E-UTRAN BCCH. In this embodiment, a new SIB with information relating to ARFCNs usable as a candidate is added to the SI message. In FIGS. 9A-9B, this SIB is denoted $SIB_k$ and comprises an ordered list of ARFCNs, each with a RAT type indicator. When rejecting a device's connection establishment attempt, the eNB sends a "ptr" value that the device interprets as an index or pointer into the list of ARFCNs in order of their appearance in $SIB_k$. A "ptr" value of N is interpreted as a pointer to the $(N+1)^{th}$ ARFCN in appearing in $SIB_k$. For example, the list shown in FIG. 9A comprises four ARFCNs—$ARFCN_{E1}$, $ARFCN_{U2}$, $ARFCN_{U4}$, and $ARFCN_{G3}$—with respective RAT-type indicators E (E-UTRAN), U (UTRAN), U, and G (GERAN). The device receives and stores the SI message comprising $SIB_k$. When the device receives RRCConnectionReject message with a "ptr" value of "01", it compares it to the stored SI and chooses $ARFCN_{U2}$ as a candidate.

By further example, the list shown in FIG. 9B comprises four ARFCNs—$ARFCN_{E2}$, $ARFCN_{E4}$, $ARFCN_{C1}$, and $ARFCN_{C3}$—with respective RAT-type indicators E, E, C (CDMA2000), and C. The device receives and stores the SI message comprising $SIB_k$. When the device receives RRCConnectionReject message with a "ptr" value of "01", it compares it to the stored SI and chooses $ARFCN_{E4}$ as a candidate. The size of "ptr" in this embodiment also can be adjusted as desired to achieve the proper granularity in network control without overly impacting the capacity of the CCCH. For example, a four-bit "ptr" would allow the operator to identify one of up to 16 entries in $SIB_k$.

Figure 10:
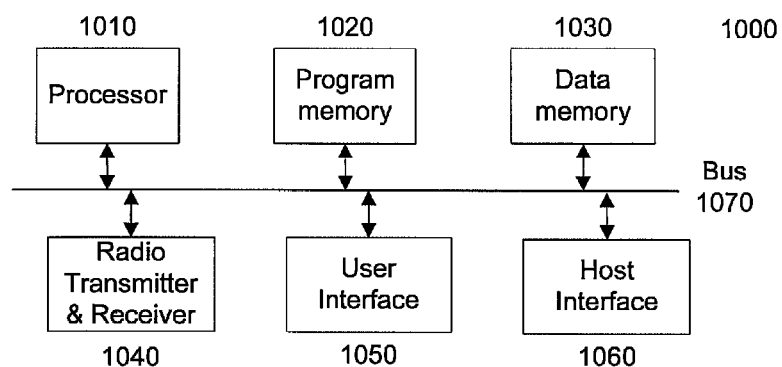
FIG. 10 is a block diagram of an exemplary wireless communication device, such as a UE, according to one or more embodiments of the present disclosure.

FIG. 10 is a block diagram of exemplary wireless communication device or apparatus, such as a UE, utilizing certain embodiments of the present disclosure, including one or more of the methods described above with reference to the figures. Device 1000 comprises processor 1010 which is operably connected to program memory 1020 and data memory 1030 via bus 1070, which may comprise parallel address and data buses, serial ports, or other methods and/or structures known to those of ordinary skill in the art. Program memory 1020 comprises software code executed by processor 1010 that enables device 1000 to communicate with one or more other devices using protocols according to various embodiments of the present disclosure, including the LTE RRC protocol layer, and improvements thereto. Program memory 1020 also comprises software code executed by processor 1010 that enables device 1000 to communicate with one or more other devices using other protocols or protocol layers, such as LTE PHY, MAC, RLC, and PDCP layer protocols standardized by 3GPP, or any improvements thereto; UMTS, HSPA, GSM, GPRS, EDGE, and/or CDMA2000 protocols; or any other protocols utilized in conjunction with radio transceiver 1040, user interface 1050, and/or host interface 1060. Program memory 1020 further comprises software code executed by processor 1010 to control the functions of device 1000, including configuring and controlling various components such as radio transceiver 1040, user interface 1050, and/or host interface 1060. Such software code may be specified or written using any known or future developed programming language, such as e.g. Java, C++, C, and Assembler, as long as the desired functionality, e.g., as defined by the implemented method steps, is preserved.

Data memory 1030 may comprise memory area for processor 1010 to store variables used in protocols, configuration, control, and other functions of device 1000. As such, program memory 1020 and data memory 1030 may comprise non-volatile memory (e.g., flash memory), volatile memory (e.g., static or dynamic RAM), or a combination thereof. Persons of ordinary skill in the art will recognize that processor 1010 may comprise multiple individual processors (not shown), each of which implements a portion of the functionality described above. In such case, multiple individual processors may be commonly connected to program memory 1020 and data memory 1030 or individually connected to multiple individual program memories and or data memories. More generally, persons of ordinary skill in the art will recognize that various protocols and other functions of device 1000 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 1040 may comprise radio-frequency transmitter and/or receiver functionality that enables device 1000 to communicate with other equipment supporting like wireless communication standards. In an exemplary embodiment, radio transceiver 940 includes an LTE transmitter and receiver that enable device 1000 to communicate with various E-UTRANs according to standards promulgated by 3GPP. In some embodiments, radio transceiver 1040 includes circuitry, firmware, etc. necessary for device 1000 to communicate with various UTRANs and GERANs. In some embodiments, radio transceiver 1040 includes circuitry, firmware, etc. necessary for device 1000 to communicate with various CDMA2000 networks. In some embodiments, radio transceiver 1040 is capable of communicating on a plurality of LTE frequency-division-duplex (FDD) frequency bands 1 through 25, as specified in 3GPP standards. In some embodiments, radio transceiver 1040 is capable of communicating on a plurality of LTE time-division-duplex (TDD) frequency bands 33 through 43, as specified in 3GPP standards. In some embodiments, radio transceiver 1040 is capable of communicating on a combination of these LTE FDD and TDD bands, as well as other bands that are specified in the 3GPP standards. In some embodiments, radio transceiver 1040 is capable of communicating on one or more unlicensed frequency bands, such as the ISM band in the region of 2.4 GHz. The radio functionality particular to each of these embodiments may be coupled with or controlled by other circuitry in device 1000, such as processor 1010 executing protocol program code stored in program memory 1020.

User interface 1050 may take various forms depending on the particular embodiment of device 1000. In some embodiments, device 1000 is a mobile phone, in which case user interface 1050 may comprise a microphone, a loudspeaker, slidable buttons, depressible buttons, a keypad, a keyboard, a display, a touchscreen display, and/or any other user-interface features commonly found on mobile phones. In other embodiments, device 1000 is a data modem capable of being utilized with a host computing device, such as a PCMCIA data card or a modem capable of being plugged into a USB port of the host computing device. In these embodiments, user interface 1050 may be very simple or may utilize features of the host computing device, such as the host device's display and/or keyboard.

Host interface 1060 of device 1000 also may take various forms depending on the particular embodiment of device 1000. In embodiments where device 1000 is a mobile phone, host interface 1060 may comprise a USB interface, an HDMI interface, or the like. In the embodiments where device 1000 is a data modem capable of being utilized with a host computing device, host interface may be a USB or PCMCIA interface.

In some embodiments, device 1000 may comprise more functionality than is shown in FIG. 9. In some embodiments, device 1000 may also comprise functionality such as a video and/or still-image camera, media player, etc., and radio transceiver 1040 may include circuitry necessary to communicate using additional radio-frequency communication standards including GSM, GPRS, EDGE, UMTS, HSPA, CDMA2000, LTE, WiFi, Bluetooth, GPS, and/or others. Persons of ordinary skill in the art will recognize the above list of features and radio-frequency communication standards is merely exemplary and not limiting to the scope of the present disclosure. Accordingly, processor 1010 may execute software code stored in program memory 1020 to control such additional functionality.

Figure 11:
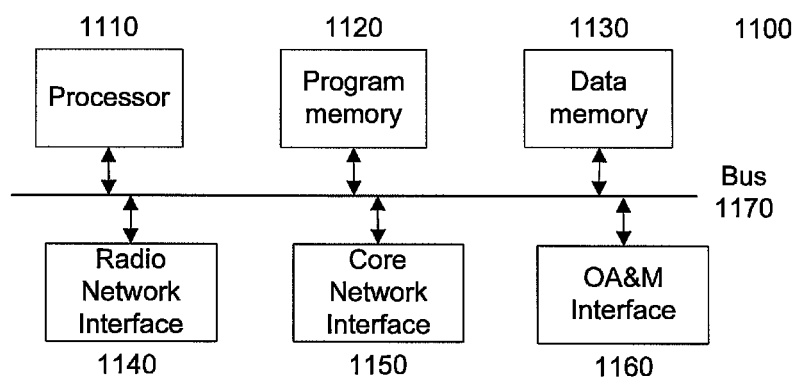
FIG. 11 is a block diagram an exemplary network equipment, such as an eNB in an E-UTRAN, according to one or more embodiments of the present disclosure.

FIG. 11 is a block diagram of an exemplary network equipment 1100, such as an eNB, utilizing certain embodiments of the present disclosure, including one or more of the methods described above with reference to FIGS. 4 through 9. Network equipment 1100 comprises processor 1110 which is operably connected to program memory 1120 and data memory 1130 via bus 1170, which may comprise parallel address and data buses, serial ports, or other methods and/or structures known to those of ordinary skill in the art. Program memory 1120 comprises software code executed by processor 1110 that enables network equipment 1100 to communicate with one or more other devices using protocols according to various embodiments of the present disclosure, including the Radio Resource Control (RRC) protocol and improvements thereto. Program memory 1120 also comprises software code executed by processor 1110 that enables network equipment 1100 to communicate with one or more other devices using other protocols or protocol layers, such as one or more of the PHY, MAC, RLC, PDCP, and RRC layer protocols standardized by 3GPP, or any other higher-layer protocols utilized in conjunction with radio network interface 1140 and core network interface 1150. By way of example and without limitation, core network interface 1150 may comprise the S1 interface and radio network interface 1150 may comprise the Uu interface, as standardized by 3GPP. Program memory 1120 further comprises software code executed by processor 1110 to control the functions of network equipment 1100, including configuring and controlling various components such as radio network interface 1140 and core network interface 1150.

Data memory 1130 may comprise memory area for processor 1110 to store variables used in protocols, configuration, control, and other functions of network equipment 1100. As such, program memory 1120 and data memory 1130 may comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1110 may comprise multiple individual processors (not shown), each of which implements a portion of the functionality described above. In such case, multiple individual processors may be commonly connected to program memory 1120 and data memory 1130 or individually connected to multiple individual program memories and/or data memories. More generally, persons of ordinary skill in the art will recognize that various protocols and other functions of network equipment 1100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1140 may comprise transmitters, receivers, and other circuitry that enables network equipment 1100 to communicate with other equipment such as, in some embodiments, a plurality of compatible user equipments (UEs). In some embodiments, radio network interface may comprise various protocols or protocol layers, such as one or more of PHY, MAC, RLC, PDCP, and RRC layer protocols standardized by 3GPP, improvements thereto, or any other higher-layer protocols utilized in conjunction with radio network interface 1140. In some embodiments, the radio network interface 1140 PHY and/or MAC layers may be based on orthogonal frequency division multiple access (OFDMA) or wideband code division multiple access (WCDMA) technologies.

Core network interface 1150 may comprise transmitters, receivers, and other circuitry that enables network equipment 1100 to communicate with other equipment in a core network such as, in some embodiments, circuit-switched (CS) and/or packet-switched Core (PS) networks. In some embodiments, core network interface 1150 may comprise the S1 interface standardized by 3GPP. In some embodiments, core network interface 1150 may comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1150 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1160 may comprise transmitters, receivers, and other circuitry that enables network equipment 1100 to communicate with external networks, computers, databases, and the like for purposes of operations, administration, and maintenance of network equipment 1100 or other network equipment operably connected thereto. Lower layers of OA&M interface 1160 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1140, core network interface 1150, and OA&M interface 1160 may be multiplexed together on a single physical interface, such as the examples listed above.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. A method for establishing a connection by a wireless communication device, comprising:
   receiving, from a first network equipment on a first control channel, at least one neighbor list identifying at least one additional network equipment, wherein each entry on the at least one neighbor list comprises a tag index and a tag value that identifies whether the corresponding entry can be used as a candidate;
   transmitting, to the first network equipment on a second control channel, a connection request message;
   receiving, from the first network equipment on the second control channel, a connection reject message comprising a pointer to an entry in the at least one neighbor list; and
   determining a second network equipment by selecting an entry on the at least one neighbor list for which the corresponding tag index matches the pointer and that the corresponding tag value indicates can be used as a candidate.

2. The method of claim 1, further comprising:
   attempting to obtain service on the second network equipment.

3. The method of claim 1, further comprising:
   attempting to obtain service from one or more network equipment identified by the at least one neighbor list received on the first control channel; and
   assigning a lowest priority to the second network equipment during the attempt to obtain service.

4. The method of claim 1, wherein:
   the first control channel is a broadcast control channel (BCCH) comprising System Information (SI) messages;
   the second control channel is a common control channel (CCCH);
   the first network equipment is a LTE evolved Node B (eNB);
   the connection request message is an RRCConnectionRequest message; and
   the connection reject message is an RRCConnectionReject message.

5. The method of claim 4, wherein the second network equipment is one of an LTE evolved Node B (eNB), a UMTS Node B, a GSM/EDGE BTS, and a CDMA2000 base station (BS).

6. The method of claim 4, wherein:
   the at least one neighbor list comprises an ordered list of additional network equipment; and
   determining the second network equipment comprises selecting an entry on the ordered list that corresponds to the pointer.

7. The method of claim 1, wherein:
   the at least one neighbor list comprises neighbor lists for at least one of an E-UTRAN, a UTRAN, a GERAN, and a CDMA2000 network; and
   at least a portion of the entries on the at least one neighbor list comprise Absolute Radio Frequency Channel Numbers (ARFCNs).

8. The method of claim 1, wherein determining the second network equipment comprises:
   subdividing the pointer into first and second pointer values;
   selecting as a candidate neighbor list one of the at least one neighbor list that corresponds to the first pointer value; and
   selecting as the second network equipment the entry from the candidate neighbor list that corresponds to the second pointer value.

9. The method of claim 1, wherein the connection request message comprises identifiers for one or more of the at least one additional network equipment with which the wireless communication device is operable.

10. A method for a network equipment to process a request to establish a connection made by a device, comprising:
    transmitting on a first control channel at least one neighbor list identifying at least one additional network equipment, wherein each entry on the at least one neighbor list comprises a tag index and a tag value that identifies whether the corresponding entry can be used as a candidate;

receiving on a second control channel a connection request message sent by the device;
determining that the connection requested cannot be supported; and
transmitting to the device on the second control channel a connection reject message comprising a pointer to an entry in the at least one neighbor list.

11. The method of claim 10, wherein:
the first control channel is a broadcast control channel (BCCH) comprising System information (SI) messages;
the second control channel is a common control channel (CCCH);
the network equipment is a LTE evolved Node B (eNB);
the connection request message is an RRCConnectionRequest message; and
the connection reject message is an RRCConnectionReject message.

12. The method of claim 11, wherein the at least one additional network equipment comprises one or more of an LTE evolved Node B (eNB), a UMTS Node B (NB), a GSM/EDGE BTS, and a CDMA2000 base station (BS).

13. The method of claim 11, wherein the at least one neighbor list identifying at least one additional network equipment comprises an ordered list of additional network equipment.

14. The method of claim 10, wherein:
the at least one neighbor list comprises neighbor lists for at least one of an E-UTRAN, a UTRAN, a GERAN, and a CDMA2000 network; and
at least a portion of the entries on the at least one neighbor list comprise Absolute Radio Frequency Channel Numbers (ARFCNs).

15. The method of claim 10, wherein:
the pointer is divided into first and second pointer values;
the first pointer value corresponds to one of the at least one neighbor list; and
the second pointer value corresponds to an entry from the one of the at least one neighbor list.

16. The method of claim 10, wherein determining that the request cannot be supported comprises determining that the network equipment lacks capacity or is too congested to support the request.

17. The method of claim 10, wherein:
the connection request message comprises identifiers for one or more of the at least one additional network equipment with which the device is operable; and
at least a portion of the contents of the connection reject message is based on said identifiers.

18. A wireless communication device, comprising:
circuitry configured to
receive, from a first network equipment on a first control channel, at least one neighbor list identifying at least one additional network equipment, wherein each entry on the at least one neighbor list comprises a tag index and a tag value that identifies whether the corresponding entry can be used as a candidate;
transmit, to the first network equipment on a second control channel, a connection request message;
receive, from the first network equipment on the second control channel, a connection reject message comprising a pointer to an entry in the at least one neighbor list; and
determine a second network equipment by selecting an entry on the at least one neighbor list for which the corresponding tag index matches the pointer and that the corresponding tag value indicates can be used as a candidate.

19. The wireless communication device of claim 18, wherein the circuitry is configured to attempt to obtain service on the second network equipment.

20. The wireless communication device of claim 18, wherein the circuitry is configured to:
attempt to obtain service from one or more network equipment identified by the at least one neighbor list received on the first control channel; and
assign a lowest priority to the second network equipment during the attempt to obtain service.

21. The wireless communication device of claim 18, wherein:
the wireless communication device is a user equipment (UE); and
the circuitry is configured such that the UE is operable with an E-UTRAN and a CDMA2000 network.

22. The wireless communication device of claim 18, wherein:
the wireless communication device is a user equipment (UE); and
the circuitry is configured such that the UE is operable with an E-UTRAN and at least one of a UTRAN and a GERAN.

23. The wireless communication device of claim 18, wherein:
the at least one neighbor list comprises an ordered list of additional network equipment; and
the circuitry is configured to select an entry on the ordered list that corresponds to the pointer.

24. The wireless communication device of claim 18, wherein the circuitry is configured to:
subdivide the pointer into first and second pointer values;
select as a candidate neighbor list one of the at least one neighbor list that corresponds to the first pointer value; and
select as the second network equipment the entry from the candidate neighbor list that corresponds to the second pointer value.

25. The wireless communication device of claim 18, wherein the circuitry is configured to include in the connection request message identifiers for one or more of the at least one additional network equipment with which the wireless communication device is operable.

26. A network equipment, comprising:
circuitry configured to
transmit on a first control channel at least one neighbor list identifying at least one additional network equipment, wherein each entry on the at least one neighbor list comprises a tag index and a tag value that identifies whether the corresponding entry can be used as a candidate;
receive on a second control channel a connection request message sent by a device;
determine that the connection requested cannot be supported; and
transmit to the device on the second control channel a connection reject message comprising a pointer to an entry in the at least one neighbor list.

27. The network equipment of claim 26, wherein:
the network equipment is an LTE evolved Node B (eNB); and
the at least one additional network equipment comprises one or more of an LTE evolved Node B (eNB), a UMTS Node B (NB), a GSM/EDGE BTS, and a CDMA2000 base station (BS).

28. The network equipment of claim 26, wherein the at least one neighbor list comprises an ordered list of additional network equipment.

29. The network equipment of claim 26, wherein:
the pointer is divided into first and second pointer values;
the first pointer value corresponds to one of the at least one neighbor list; and
the second pointer value corresponds to an entry from the one of the at least one neighbor list.

30. The network equipment of claim 26, wherein the circuitry is configured to determine that the connection request cannot be supported by determining that the network equipment lacks capacity or is too congested to support the request.

31. The network equipment of claim 26, wherein:
the connection request message comprises identifiers for one or more of the at least one additional network equipment with which the device is operable; and
at least a portion of the contents of the connection reject message is based on said identifiers.

* * * * *